April 13, 1948.    R. M. MITCHELL    2,439,413
CRYPTOGRAPHIC SLIDE RULE
Filed Oct. 21, 1943
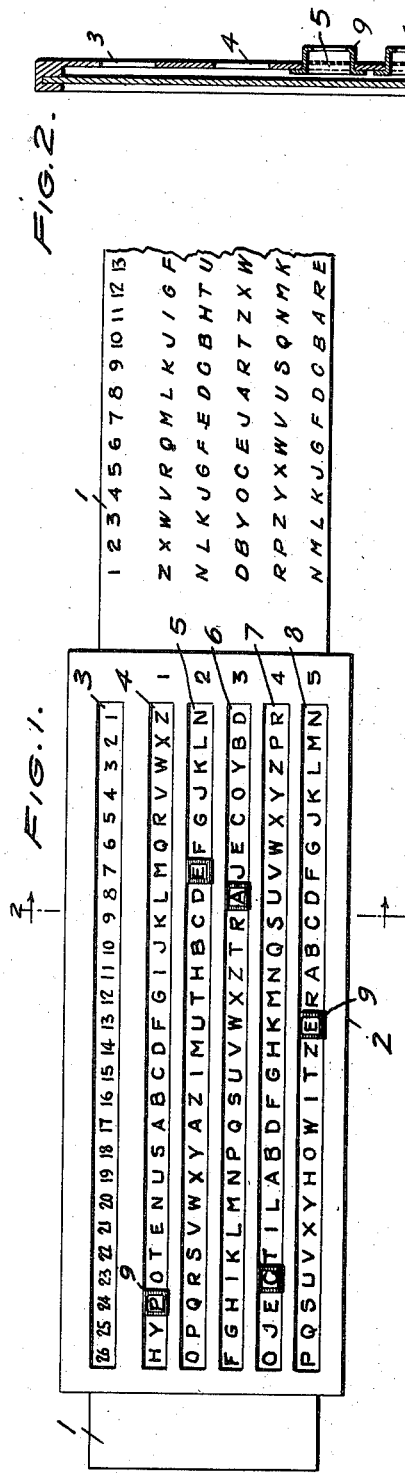
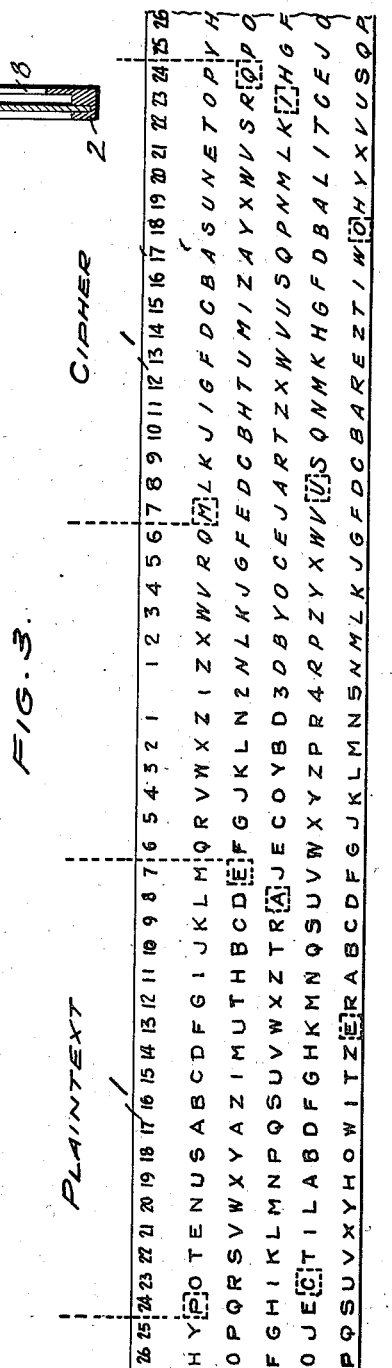
INVENTOR
ROBERT M. MITCHELL
BY William D. Hall
ATTORNEY Patented Apr. 13, 1948

2,439,413

UNITED STATES PATENT OFFICE 2,439,413

CRYPTOGRAPHIC SLIDE RULE

Robert M. Mitchell, United States Army

Application October 21, 1943, Serial No. 507,110

6 Claims. (Cl. 35—2)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to devices for enciphering and deciphering code messages.

It is an object of the invention to provide a mechanical device in the form of a slide rule by means of which messages can be rapidly and accurately coded and code messages rapidly deciphered.

A further object is the provision of a device which enables a code to be conveniently and quickly changed when desired so that it is practically impossible to decipher the code without employing one of the devices arranged in a predetermined manner.

These and other objects are attained by the novel structure and arrangement hereinafter described and illustrated by the accompanying drawings, forming a part hereof, and in which Figure 1 is a plan view of a slide rule embodying the invention.

Figure 2 is a sectional view taken on line 2—2 of Figure 1.

Figure 3 is a plan view of a slide having a section of plain text and a section of cipher text.

Referring to the drawings, in Figure 1 the ciphering device is shown to comprise rule 1, upon which is slidably mounted a slider 2, having six longitudinal slots 3, 4, 5, 6, 7, 8. Slidably mounted in each of the slots is a small frame 9. The frame 9 facilitates the location of characters on the rule. The rule 1 can be made of cardboard, wood, plastic material, or any other suitable material with the characters marked thereon or strips of paper bearing the characters pasted thereon. Likewise the slider can be made of plastic or other suitable material.

The rule 1 is shown in Figures 1 and 3 to comprise two sections, one section carrying 5 rows of letters alphabetically arranged, and the other section having five rows of cipher text. Each section has a row of numerals from 1 to 26.

The code is established on the alphabetically arranged side of the rule by selecting five words. For example in the illustration, the words "hypotenuse," "azimuth," "trajectory," "projectile" and "howitzer" have been chosen. A word is written in one line and the letters of the alphabet not appearing in the word are then written in their proper order. If a letter appears more than once in a word, it is omitted where it would normally occur a second time, e. g. the words "hypotenuse" and "trajectory" as seen in the drawing.

The cipher text side of the rule is formed by writing each line of the plain text in reverse order.

In operation, to encipher a five letter word such as "peace," the slider 2 is placed over the alphabetically arranged side of the rule, and the little frames placed over the letters of the word in the five lines. It will be noted that the extremities of the word are at 24 and 7. The slider is then moved over to the cipher side of the rule, and positioned so that the extreme frames fall under 24 and 7. The sequence will of course be reversed and the extremities are now 7 and 24. The letters appearing under the frames are noted to be MQIUO, which is the code word for "peace." Obviously, a given code word can be deciphered by reversing the operations. That is, the slider is first placed over the cipher text and the extremities of the code word noted. The slider is then moved over the alphabetically arranged side and the letters of the word will be found under the several frames.

If the word contains more than five letters, it will be obviously divided into groups of five letters or less. To enable the plain text and cipher texts to be readily distinguished, they are marked in different kinds of alphabets. For another example, the alphabetically arranged side may be red, and the cipher text may be blue.

From the above desciption it will be seen that there has been provided a simple and very effective device for rapidly forming code words which are practically undecipherable except by using one of the devices, properly arranged. While the plain text and cipher text have been described as having five rows of characters, obviously any number of rows can be used without departing from the spirit of the invention.

The invention having been described, what is claimed is:

1. A device for enciphering or deciphering secret messages comprising, a rule having a section provided with a plurality of rows of characters arranged in a definite order to form a plain text no character being repeated in the same row, and a second section having a plurality of rows of cipher text formed by arranging the plain text rows in reverse order, and a slider mounted on the rule for movement longitudinally thereof, said slider having slots therein aligned with said rows.

2. A device for enciphering and deciphering code messages, comprising a rule provided with a first section having a plurality of rows of letters arranged in a predetermined order, no letter being repeated in the same row and a second section having a plurality of rows of cipher text formed by arranging the letters of the first section in reverse order, and a slide movably mounted on the rule, said slide having a plurality of slots corresponding to the rows of the sections.

3. A device for enciphering and deciphering code messages, comprising a rule provided with a first section having a plurality of rows of letters arranged in numbered columns, the letters in each row being in a definite order with no letter being repeated and a second section having a plurality of rows of cipher text formed by arranging the letters of the first section in reverse order.

4. A device for enciphering and deciphering code messages, comprising a rule, a slider movably mounted on said rule, said slider having six slots, a frame slidably mounted in five of the respective slots, said rule having a section containing five rows of symbols, said symbols being in predetermined order, no symbol being repeated in the same row, and a second section containing five rows of symbols formed by arranging each of the first mentioned rows in reverse order.

5. A device for enciphering and deciphering code messages comprising a rule, a slider movably mounted on the rule, said slider having a plurality of longitudinal slots, a frame slidably mounted in each of said respective slots, said rule having a section provided with a plurality of rows of letters, each row of letters being arranged in a definite order, no letter being repeated in the same row, a plurality of rows of cipher text formed by arranging each of said first mentioned rows in reverse order, said rows coinciding with said slots, and each of said frames having an opening of such size as to expose one letter only.

6. In a device for enciphering and deciphering code messages, a rule having a section provided with a plurality of rows of letters, the letters in each row being arranged in a definite order, no letter being repeated in the same row, and a second section having the same number of rows as said first section, the letters in each of said rows in the second section being in reverse order of the corresponding row of said first section.

ROBERT M. MITCHELL.

REFERENCES CITED

The following references are of record in the file of this patent:

UNITED STATES PATENTS

| Number | Name | Date |
|---|---|---|
| 492,677 | Harte | Feb. 28, 1893 |
| 767,087 | Speckman | Aug. 9, 1904 |
| 1,248,238 | Young | Nov. 27, 1917 |
| 1,683,827 | Ingram | Sept. 11, 1928 |